United States Patent
Doi et al.

(10) Patent No.: US 7,461,121 B2
(45) Date of Patent: Dec. 2, 2008

(54) CONTROLLING THE DISPLAY OF CONTENTS DESIGNATED BY MULTIPLE PORTABLE TERMINALS ON A COMMON DISPLAY DEVICE IN A SEGMENTED AREA HAVING A TERMINAL-SPECIFIC CURSOR

(75) Inventors: Koji Doi, Yokohama (JP); Yoshiaki Morimoto, Kawasaki (JP); Takenori Morinaga, Kawasaki (JP); Jun Maeoka, Kawasaki (JP); Motoaki Satoyama, Sagamihara (JP); Yoshitaka Shibata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 918 days.

(21) Appl. No.: 10/651,254

(22) Filed: Aug. 29, 2003

(65) Prior Publication Data

US 2004/0236825 A1 Nov. 25, 2004

(30) Foreign Application Priority Data

May 21, 2003 (JP) ............................. 2003-142832
Jul. 18, 2003 (JP) ............................. 2003-198846

(51) Int. Cl.
*G06F 15/16* (2006.01)
*G06F 3/00* (2006.01)
(52) U.S. Cl. .................. 709/203; 709/205; 715/753
(58) Field of Classification Search ................. 709/203, 709/204, 205; 715/751, 753
See application file for complete search history.

(56) References Cited

U.S. PATENT DOCUMENTS

| | | | | | |
|---|---|---|---|---|---|
| 4,974,173 | A | * | 11/1990 | Stefik et al. | 715/751 |
| 5,392,400 | A | * | 2/1995 | Berkowitz et al. | 709/203 |
| 6,237,025 | B1 | * | 5/2001 | Ludwig et al. | 709/204 |
| 2003/0028593 | A1 | * | 2/2003 | Ye et al. | 709/204 |
| 2003/0138624 | A1 | * | 7/2003 | Burmeister et al. | 428/343 |

FOREIGN PATENT DOCUMENTS

| | | |
|---|---|---|
| JP | 2002-123698 | 4/2002 |
| JP | 2002-149615 | 5/2002 |
| JP | 2002-164968 | 6/2002 |

\* cited by examiner

*Primary Examiner*—Andrew Caldwell
*Assistant Examiner*—John M Frink
(74) *Attorney, Agent, or Firm*—McDermott Will & Emery LLP

(57) ABSTRACT

An information display system in which a single display device can be shared by a plurality of information terminal users is disclosed. An interface sets each of the portable telephones held by users in correspondence with the display device for communication. The display device is adapted to be connected with a plurality of portable terminals and manage the data exchange. In displaying the screen, a cursor identifiable on the screen is assigned to each portable terminal, the screen is segmented into a plurality of areas to display a plurality of contents on a single screen, and the screen of the portable terminal is also used as a display area.

6 Claims, 10 Drawing Sheets

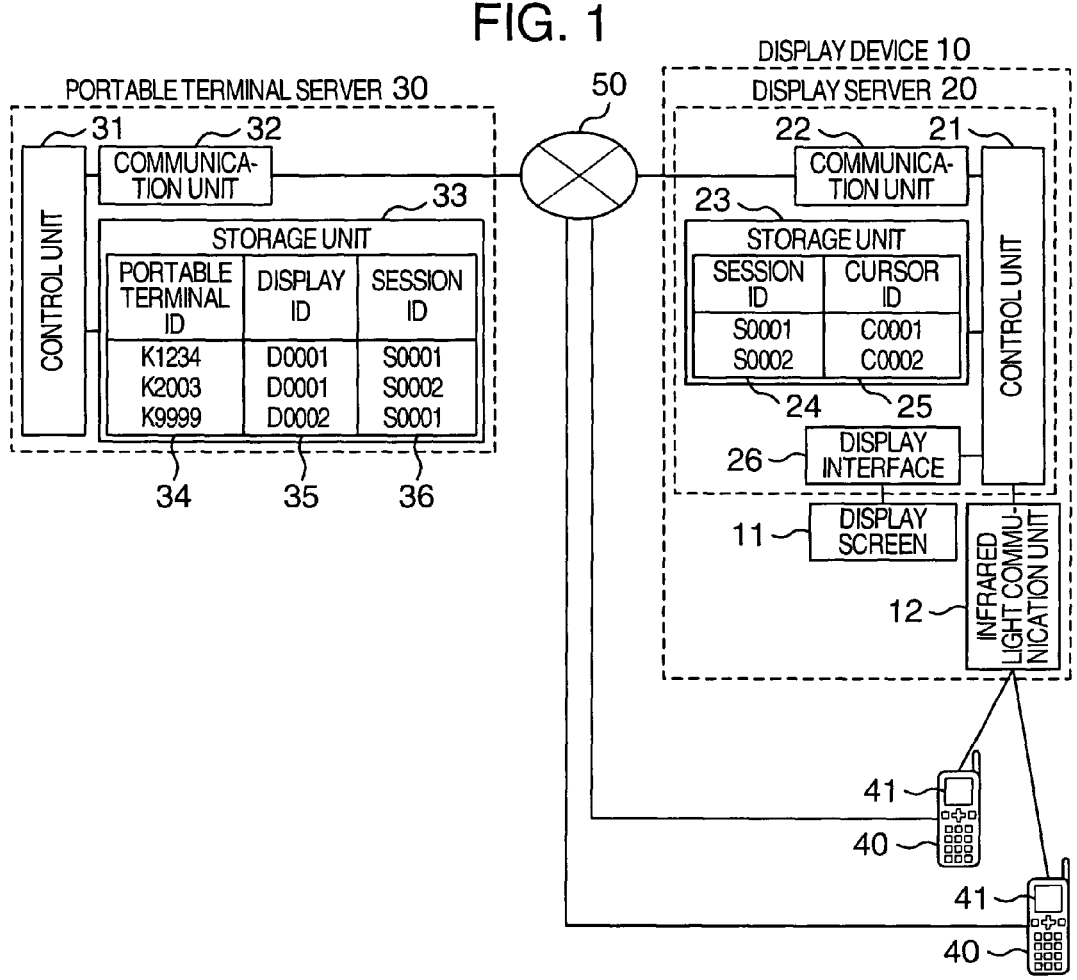

CONTROLLING THE DISPLAY OF CONTENTS DESIGNATED BY MULTIPLE PORTABLE TERMINALS ON A COMMON DISPLAY DEVICE IN A SEGMENTED AREA HAVING A TERMINAL-SPECIFIC CURSOR

BACKGROUND OF THE INVENTION

The present invention relates to an information display system for displaying information in operatively interlocked relation between a plurality of portable terminals and a display device, or in particular to an information display system and a system processing method in which a single display device can be shared by a plurality of users.

In recent years, the use of portable terminals including a portable telephone and a personal digital assistance (PDA) has widely extended. The connectable areas of the portable telephones have spread over the whole country, and the portable terminals equipped with the functions of electronic mail and internet connection as well as phone call are the order of the day. Also with other types of portable terminals, the extension of the wireless LAN service in all urban areas has made possible the connection to a network at all places. The user thus can access the information on the network at any place. Nevertheless, the portability is crucial for the portable terminals, for which the compactness and lightweight are given priority. The display screen, therefore, is small as compared with that of the personal computer, etc. For this reason, it is difficult to read a long sentence or to view a large image. Another problem is that only one user can watch the screen at a time.

In order to solve this problem, JP-A-2002-164968 discloses a system in which a plurality of portable telephones and a display device are connected directly to each other so that the display device can be used as a display screen for the portable telephone.

JP-A-2002-123698, on the other hand, proposes a system in which a display device placed at a street corner is used as a display screen of the portable telephones held by the users.

SUMMARY OF THE INVENTION

The conventional methods described above pose the problems described below.

Specifically, one user occupies one display device. In the case where there are a plurality of users, therefore, the second and other users are required to wait until the display device becomes available for use and therefore the display device cannot be used whenever desired.

In the system disclosed in JP-A-2002-164968, the portable telephones and the display device are required to be connected directly to each other. This direct connection indicates the serial connection using a serial cable or the like or the LAN connection using a network cable or a wireless LAN system. It is bothersome, however, to connect by wire each time of use, while wireless connection requires a wireless communication unit as an essential component for use with the portable telephones and the display device. Further, the only configuration that has conventionally been conceived is that the data to be displayed are provided by the portable telephones. Therefore, the data on the network, if to be displayed, can be acquired only through the portable telephones.

According to JP-A-2002-123698, on the other hand, a configuration is possible in which the portable telephones and the display device are connected indirectly through an internet instead of directly, by providing a means for setting each portable telephone in correspondence with the display device. Nevertheless, the data to be displayed can be provided only by the display device, and the data stored in the internal memory of the portable telephones cannot be displayed.

Accordingly, an object of this invention is to provide an information display system, wherein a display device can be shared by a plurality of users at a time.

Another object of the invention is to provide a versatile information display system, wherein the method of connecting a plurality of portable terminals and a display device to each other and the method of providing the display data can be freely selected.

According to one aspect of the invention, there is provided an information display system comprising a plurality of portable terminals held by users, a display device having means for communication with the portable terminal and capable of controlling the display data in accordance with a request, and means for setting the portable terminal to correspond with the display device.

The display device manages the connection and exchanges data with a plurality of portable terminals. This display device also provides a user interface which enables a plurality of users to use the display on the screen of a display device at a time. Specifically, the display device has the following functions: (1) Each portable terminal is assigned a cursor having such a feature that the particular terminal can be uniquely identified on the screen; (2) The display area on the screen is divided into a plurality of areas in the case where a plurality of users try to display different pages on the same screen; and (3) The screen of the portable terminal is used as a display area in the case where the data to be accessed only by one user is displayed. The system having these functions permits a plurality of users to share a display device.

The available methods of connection between a portable terminal and a display device include the direct connection method and the indirect connection method. In the direction connection method, wire or wireless communication is established directly between a portable terminal and a display device. In this case, the correspondence between the portable terminal and the display device is obvious. In the indirect connection method, on the other hand, no direct communication is established but correspondence is set between a portable terminal and a display device to establish communication indirectly between them through networks associated with the portable terminal and the display device, respectively. The methods available for supplying data to be displayed includes a method in which the data are supplied from a portable terminal and a method in which the data are supplied from a display device. The method in which the data are supplied from the portable terminal include two methods, i.e. (1) a method in which the data stored in the internal memory unit of the portable terminal are sent to the display device, and (2) a method in which the data are sent to the display device through the portable terminal from a separate server connected with the particular portable terminal by a network. The methods in which the data are supplied from the display device also includes two methods, i.e. (1) a method in which the data are stored in the internal memory of the display device, and (2) a method in which the data are acquired from a separate server connected with the display device by a network.

A system serving the purposes can be constructed in a versatile way by appropriately selecting or combining the connection methods and the methods of providing data described above.

Further, an efficient system construction is made possible by providing a portable terminal server for distributing a program to the portable terminals and acting as an intermediary for data exchange between the portable terminals and the display device.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing first and third embodiments of the invention.

FIG. 2 is a diagram showing the structure of a packet used in the first and third embodiments.

DETAILED DESCRIPTION OF THE EMBODIMENTS

Embodiments of the invention will be explained in detail below with reference to the Figures.

Figure 3:
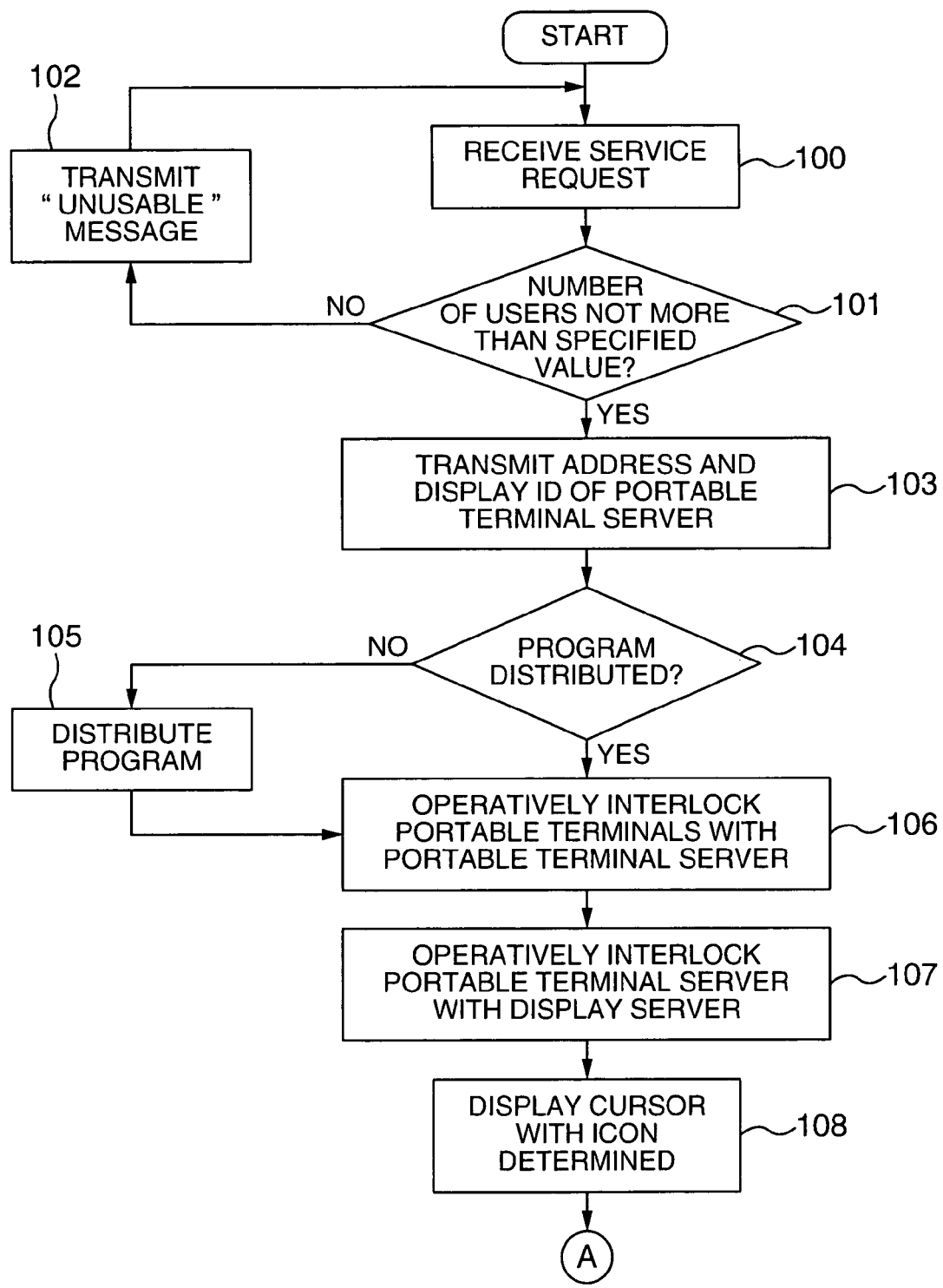
FIG. 3 is a flowchart showing the first and third embodiments.
Figure 4:
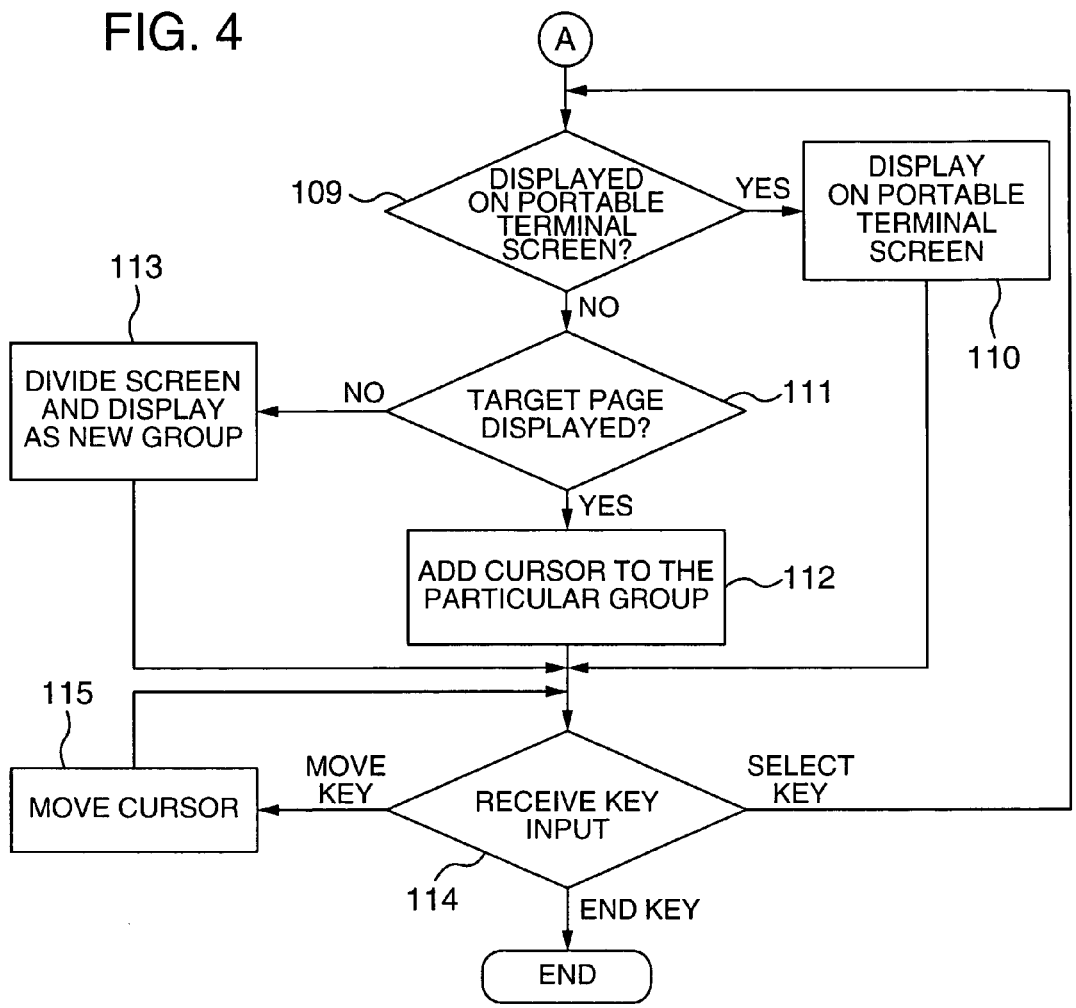
FIG. 4 is a flowchart showing the first embodiment.

First, an explanation will given about a first embodiment. FIG. 1 is a block diagram showing an information display system according to an embodiment of the invention. FIG. 2 is a diagram showing the structure of a packet used for the information display system. FIGS. 3 and 4 are flowcharts showing the operation of the information display system. FIGS. 5 to 8 are diagrams showing an example of the display on the screen of the information display system. The information displayed on the information display system are generally assumed to include the WWW (world wide web) information, the information stored in the portable terminal held by the user and specific information supplied by the manager of the display device.

In FIG. 1, a display device 10 is configured of a display screen 11, an infrared light communication unit 12 and a display server 20. The display screen 11 displays the information. The infrared communication unit 12 establishes infrared light communication with portable telephones 40. The display server 20 includes a control unit 21, a communication unit 22, a storage unit 23 and a display interface 26. The storage unit 23 has storage areas therein for a session ID 24 and a cursor ID 25. The portable terminal server 30 includes a control unit 31, a communication unit 32 and a storage unit 33. The storage unit 33 has storage areas therein for a portable terminal ID 34, a display ID 35 and a session ID 36. The portable telephones 40 each have a screen 41. Though details are not shown in FIG. 1, the portable telephones 40 each are connected to an internet 50 through a gateway server of a portable telephone base station and a communication carrier. The communication units 22, 32 are connected to an internet 50 for establishing communication between the portable telephones 40 and the portable terminal server 30 on the one hand and between the portable terminal server 30 and the display device 20 on the other hand.

Next, the operation of each part shown in FIG. 1 will be explained with reference to the flowcharts of FIGS. 3 and 4.

First, the users operate the portable telephones 40 before the display device 10 to start the infrared light communication. The display server 20 receives a service request through the infrared light communication unit 12 (step 100). The display server 20 determines whether the persons served currently by the display device 10 are in a specified number or less (step 101), and in the case where it is more than the specified value, transmits the message by infrared light communication to the effect that the service cannot be received for now (step 102).

In the case where the number of persons currently served by the display device 10 is the specified value or less, on the other hand, the display server 20 transmits, by infrared light communication, an address for specifying the portable terminal server 30 corresponding to the type of the portable terminals (the portable telephones 40 in this case) on the internet 50 and the display ID for specifying the particular display device 10 (step 103)

Using the address thus received, the portable telephones 40 are connected to the portable terminal server 30 through the internet 50. The portable terminal server 30 determines whether the portable telephones 40 have a program for receiving the service or not (step 104), and in the case where the portable telephones 40 have no such a program, the program stored in the storage unit 33 of the portable terminal server 30 is downloaded (step 105). This program has a function of transmitting a key input in the portable telephones 40 to the portable terminal server 30, a function of displaying the screen data transmitted from the portable terminal server 30 on the screens 41 of the portable telephones 40 and a function of accessing the information by use of the screens 41 on the portable telephones 40.

The portable telephones 40 start the program. According to this program, the portable terminal server 30 is connected again and supplied with the portable terminal ID unique to each portable telephone 40 and the display ID received in step 103. The portable terminal server 30 sets the two IDs thus received in corresponding relation with each other and stores them in the storage areas 34, 35 of the storage unit 33. As a result, the portable telephones 40 and the portable terminal server 30 are prepared to be operatively interlocked with each other (step 106).

The portable terminal server 30 is connected to the display server 20 and issues a request to start the service. The display server 20 generates a session ID for specifying an object of the service to be provided, and delivers the session ID to the portable terminal server 30 while at the same time storing it in the storage area 24 as a new entry created in the storage unit 23. The portable terminal server 30 stores the delivered session ID in the storage area 36 as a corresponding entry in the storage unit 33. As a result, the portable terminal server 30 and the display server 20 are prepared to be operatively interlocked with each other (step 107).

The display server 20 assigns the new object of service with a cursor having an icon which becomes unique on the display screen 11, and stores the ID thereof in the storage area 25 of the corresponding entry in the storage unit 23 while at the same time displaying the cursor with the icon on the screen. Further, the image data of the particular icon is transmitted to the corresponding portable telephone 40 through the portable terminal server 30. The portable telephone 40 displays the received image data on the screen 41, and presents an operable cursor to the user (step 108). Through these steps, the service is started.

The display server 20 reads the screen display data of the information to be provided from the storage unit 23. Immediately after starting the service, the screen display data constitutes the data of the main screen. The display server 20 selects a proper screen display method (step 109). In the case where the information to be displayed is a kind of data relating to the personal privacy or the like data not desirably visible by other persons, the screen display data is transmitted to the particular portable telephone 40 and displayed on the screen 41 thereof (step 110). Otherwise, the information is displayed on the display screen 11, followed by the next determination (step 111). In the case where the page to be displayed (screen display data) is being accessed by other users on the same screen, the cursor of the user is added to the group of the areas displayed on the page (step 112). In the case where the page is absent on the same screen, the screen is divided and a new display area is created where the particular page is displayed. Also, a new group is created for this display area and the cursor of the user is added to it (step 113).

Upon the key operation of a portable telephone 40 by the user, the code of the key depressed is transmitted to the portable terminal server 30 (step 114). The portable terminal server 30 sends the request corresponding to the depressed key to the display server 20, which executes the requested process. In the case where the "MOVE" key ("DIRECTION" key) is depressed, for example, the cursor is moved in accordance with the key (step 115). In the case where the depressed key is the "SELECT" key ("DECISION" key), on the other hand, the information corresponding to the item indicated by the cursor is displayed (returned to step 109). In the case where the "END" key is depressed, the portable terminal server 30 and the display server 20 end the service for the particular portable telephone 40.

The display server 20 specifies a protocol for receiving the request from an object of service (portable terminal). The portable terminals of a kind that can exchange data based on this protocol, therefore, can use the service.

The first embodiment is so configured that the portable terminal server 30 acts as an intermediary for data exchange between the portable telephones 40 and the display server 20 on the assumption that the portable telephones 40 are not equipped with the processing ability to use the protocol. In this configuration, the program operated on the portable telephones 40 for using the service is transmitted to the portable terminal server 30 with the information of the key input by the user as an event. The portable terminal server 30 converts this information into the particular protocol and then transmits it to the display server 20. Also for the data sent from the display server 20 to the portable telephones 40, the portable terminal server 30 changes the protocol in a similar way. As described above, the employment of a configuration in which the portable terminal server 30 acts as an intermediary permits the display server 20 to meet the requirements of all the objects of service with a single protocol. Also, the provision of service to a new type of portable terminal is facilitated by preparing a portable terminal server 30 compatible with the service.

FIG. 2 shows a structure of a packet used for the above-mentioned data exchange. In FIG. 2, the packet 60 sent from the portable telephones 40 to the portable terminal server 30 has data items including a portable terminal ID 61, an event type 62 and the number of times 63. Also, the packet 70 sent from the portable terminal server 30 to the display server 20 has such data items as a session ID 71 and a request type 72.

Each packet 60 has a portable terminal ID 61, and therefore the portable terminal server 30 can identify the portable telephone 40 that has sent the packet. The type of operation (key depression, etc.) performed by the user is inserted as the event type 62. The number of times 63 is for collecting the same type of continuous events into a single packet. In the case where the user depresses the "MOVE RIGHT" key of a portable telephone 40 three times successively in a short time length, for example, three packets indicating an event "MOVE RIGHT key depressed" would be sent. These packets are collected and the value "3" is noted in "number of times" 63. This idea can reduce the amount of packets transmitted, and therefore the time required for packet transmission is reduced, thereby making it possible to improve the reaction speed of GUI. This is effective especially in the case where the data transfer rate is low.

Each packet 70 has a session ID 71, and therefore the display server 20 can identify the object of service that has sent a request. As a result, the service can be provided to a plurality of users at the same time. The "request type" 72 indicates the type of the request such as the "move cursor", "select item" or "end service".

Next, examples of screen display shown in FIG. 5 to 8 will be explained.

Figure 5:
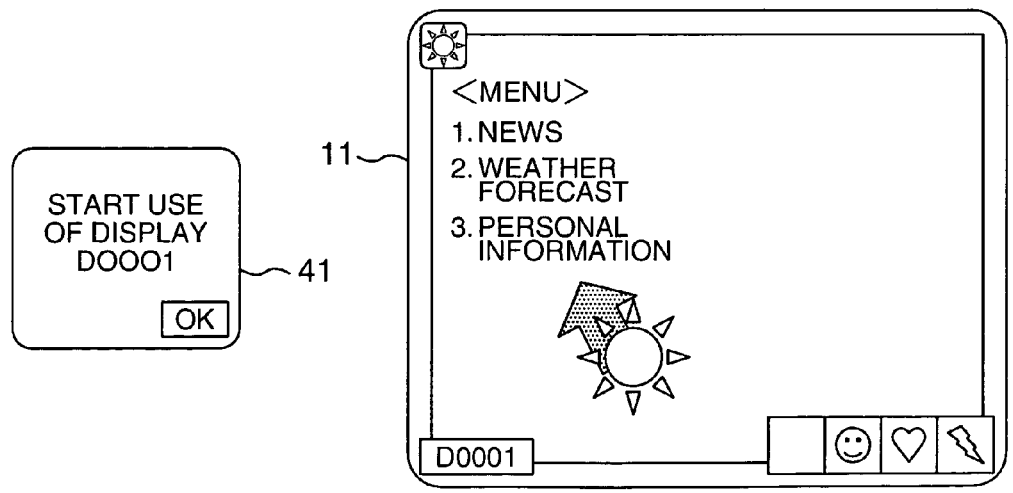
FIG. 5 is a diagram showing an example of the display on the screen according to the first embodiment.

FIG. 5 shows the screen display for starting the service. One other person is already using the service (cursor of solar icon). On the display screen 11 shown in FIG. 5, the boxes arranged at the lower right part of the screen indicate that the maximum number of persons who can use the display device 10 is four, of which one frame is currently in use and that the next user is assigned the cursor of smile icon. This GUI idea has the advantage that the maximum number of users of the display device, the current number of users and the number of users subsequently allowed to use the system at the same time can be grasped at a glance. Further, each user is informed of the icon assigned to him/her in advance, and therefore can start to use the service smoothly. Also, the solar icon at the upper left corner of the screen indicates that the whole screen is occupied by the user assigned the cursor of solar icon. This idea makes it possible for each user to grasp the area of display assigned to him/her at a glance.

Figure 6:
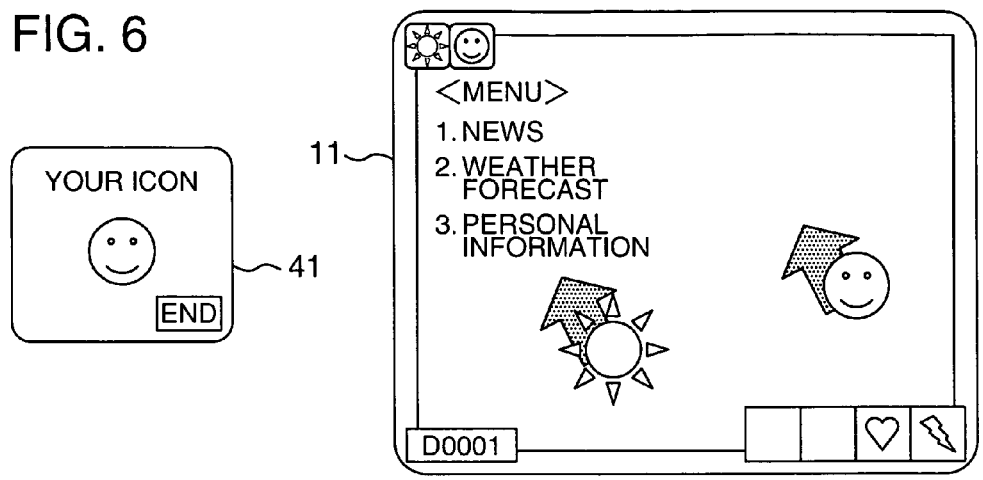
FIG. 6 is a diagram showing another example of the display on the screen according to the first embodiment.

In FIG. 6, the user that has started to use the service (cursor of smile icon) and the other user (cursor of solar icon) share the display area over the whole screen and accesses the same page.

Figure 7:
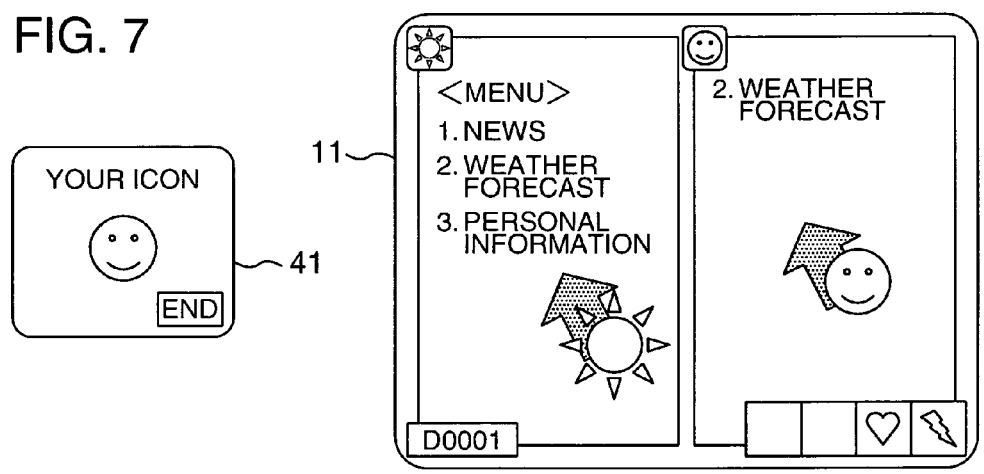
FIG. 7 is a diagram showing still another example of the display on the screen according to the first embodiment.

FIG. 7 shows the result of the current user selecting "2. Weather forecast" in FIG. 6. Since two users display different pages, the screen display area is divided.

Figure 8:
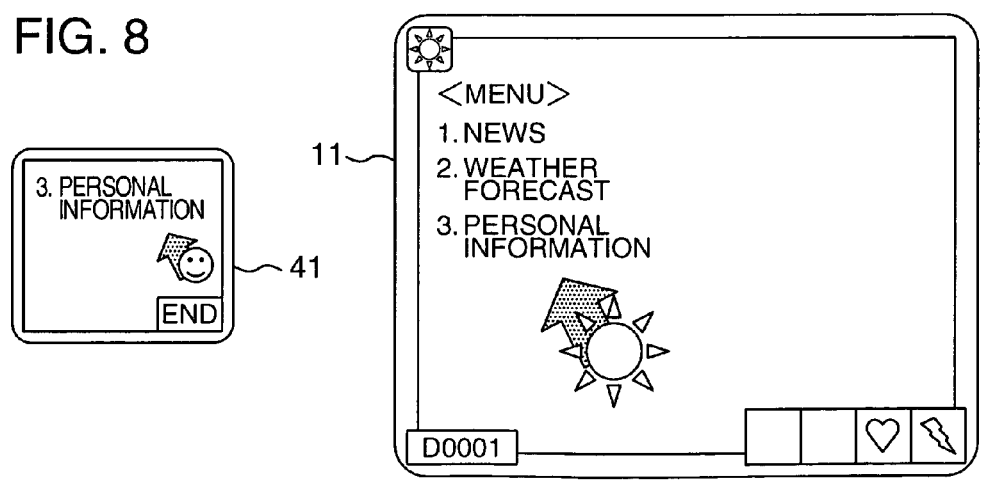
FIG. 8 is a diagram showing yet another example of the display on the screen according to the first embodiment.

FIG. 8 shows the result of the user selecting "3. Personal information". Since the information to be displayed should be accessed personally, the user accesses the information on the screen 41 of the portable telephone 40 held by himself/herself.

According to the embodiment described above, the infrared light communication unit 12 is used as a means for setting each portable telephone 40 and the display device 10 in correspondence with each other. Nevertheless, other methods available may include the manual input of display ID by the user, the use of a wireless communication unit (wireless LAN or Bluetooth (registered trade mark of Bluetooth SIG, Inc.)), serial connection and memory card.

Also, the portable terminal ID is used for identifying the portable telephones 40 in communication between the portable telephones 40 and the portable terminal server 30. As an alternative, the session ID may be issued at the time of connection as in the case of communication between the portable terminal server 30 and the display server 20.

In starting the service, an icon is assigned to each user by the display server 20 in the aforementioned embodiment. As an alternative, a favorite icon for the user is registered in the portable terminal, and can be used as an icon for the cursor.

Also, in the embodiments described above, the information display method is selected in such a manner that which is used for display, the screens 41 of the portable telephones 40 or the display screen 11, is determined in accordance with the properties of the information displayed. As an alternative, the user may positively select either method by his/her operation. In another alternative configuration, the main screen is always displayed on the display screen 11, and all the items selected by the user are displayed on the screens 41 of the portable telephones 40.

Figure 9:
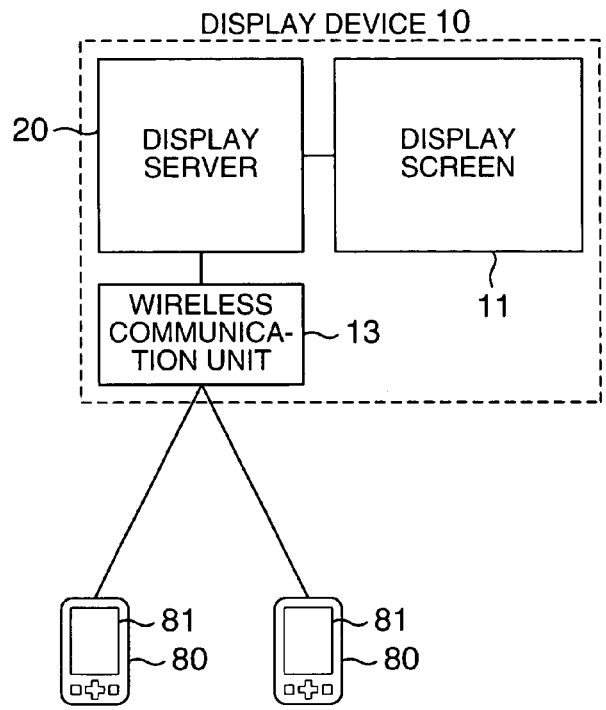
FIG. 9 is a block diagram showing a second embodiment.

Next, a second embodiment will be explained. FIG. 9 is a block diagram showing an information display system according to the second embodiment of the invention.

In FIG. 9, the display device 10 is configured of a display screen 11, a wireless communication unit 13 and a display server 20. The display screen 11 displays the information. The wireless communication unit 13 establishes wireless communication with a portable information terminal 80. The portable information terminals 80 each have a screen 81 and is equipped with a built-in function of wireless communication.

Only the difference from the first embodiment will be explained below.

A program for using the information display system is already installed in the portable information terminals 80. This program enables the communication to be established directly with the display server 20. In the second embodiment, therefore, the portable terminal server 30 is not used.

Since direct communication is carried out between the portable information terminals 80 and the display server 20, the correspondence between these two devices is obvious. The data to be displayed on the screen are stored in the internal memory of each portable information terminal 80. The display server 20 acquires this data by direct communication with the portable information terminal 80. According to the second embodiment, therefore, the display server 20 and the portable information terminals 80 are not connected with the internet 50.

Unlike in the first and second embodiments which use the portable telephone and the portable information terminal as an example of a portable terminal, the PHS (personal handyphone system) or the notebook-sized personal computer can alternatively be used with equal effect.

Next, a third embodiment will be explained. In this embodiment, the system configuration and the first half of the processing flow (before service start) are identical to the corresponding flow in the first embodiment. FIGS. 11 to 20 show examples of screen display of the information display system according to the third embodiment.

The difference of this information display system from that of the first embodiment lies in that: (1) The main screen (whole map) is always displayed on the display screen 11, and all the items selected by the user are displayed on the screens 41 of the portable telephones 40; (2) The data displayed on the display screen 11 are not mainly the text, but are a graphical presentation of an actual map (such as the map of an exhibition hall) or a map of a virtual space; and (3) the cursor (character) manipulated by the user on the display screen 11 cannot freely move to an arbitrarily position on the screen but can discretely move only to predetermined positions.

Figure 10:
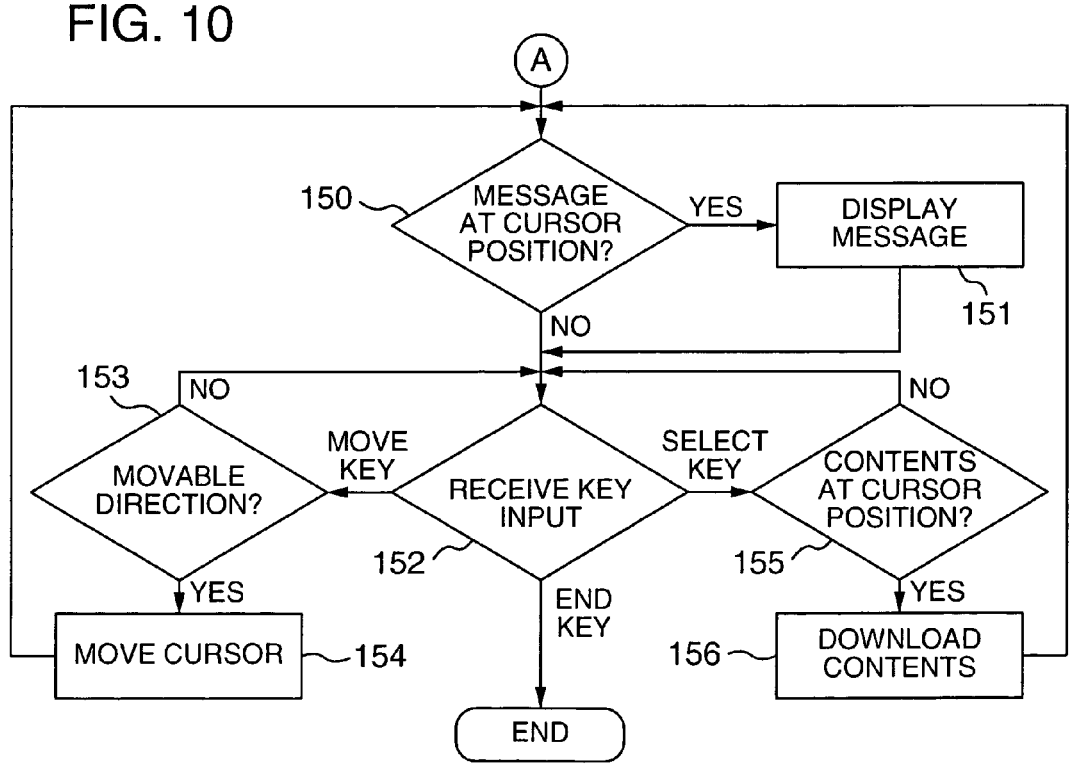
FIG. 10 is a flowchart showing a third embodiment.

With reference to the flowcharts of FIGS. 3 and 10, the operation of this information display system will be explained.

The process before the portable telephones 40 held by the users and the display server 20 come to be operatively interlocked with each other and the service is started by the information display system (steps 100 to 108 in FIG. 8) is similar to the corresponding process in the first embodiment and therefore will not be explained.

By the time point when the service is started, the display server 20 has displayed the main screen (whole map) on the display screen 11. A point where the cursor is movable is indicated on the main screen.

When the cursor assigned to the user is displayed on the screen, the display server 20 determines whether the point indicated (selected) by the particular cursor has a message or not (step 150). The message is the information supplied by each point and assumes the form of a character string or the like. In the case where the point contains a message, the content thereof is displayed on the screen (step 151).

Upon key operation of a portable telephone 40 by the user, the code of the depressed key is transmitted to the portable terminal server 30 (step 152). The portable terminal server 30 sends a request corresponding to the depressed key to the display server 20, which executes the required process.

In the case where the depressed key is the "MOVE" key ("DIRECTION" key), it is first determined whether the cursor can be moved in the direction corresponding to the particular key, i.e. whether other points exist in that direction or not (step 153). In the case where a movable point exists, the cursor on the screen is moved to the target point (step 154) and the process is returned to step 150. In the absence of a movable point, on the other hand, the process is returned to step 150 without moving the cursor.

In the case where the depressed key is the "SELECT" key ("DECISION" key), it is first determined whether the point indicated by the cursor contains data (information that can be downloaded to the portable telephones 40) or not (step 155). In the absence of such contents, the process returns to step 150. In the presence of such contents, on the other hand, the display server 20 reads the data of the particular contents from the storage unit 23, and transmits them to the portable telephone 40 involved through the portable terminal server 30 (step 156). The portable telephone 40 holds the data thus received and returns to step 150. In the process, the user may alternatively suspend the service of the display server 20 and access the acquired contents on the screen 41 of the portable telephone 40.

In the case where the depressed key is the "END" key, the portable terminal server 30 and the display server 20 end the service to the portable telephones 40.

Next, with reference to FIGS. 11 to 20, an example of display on the display screen 11 will be explained.

Figure 11:
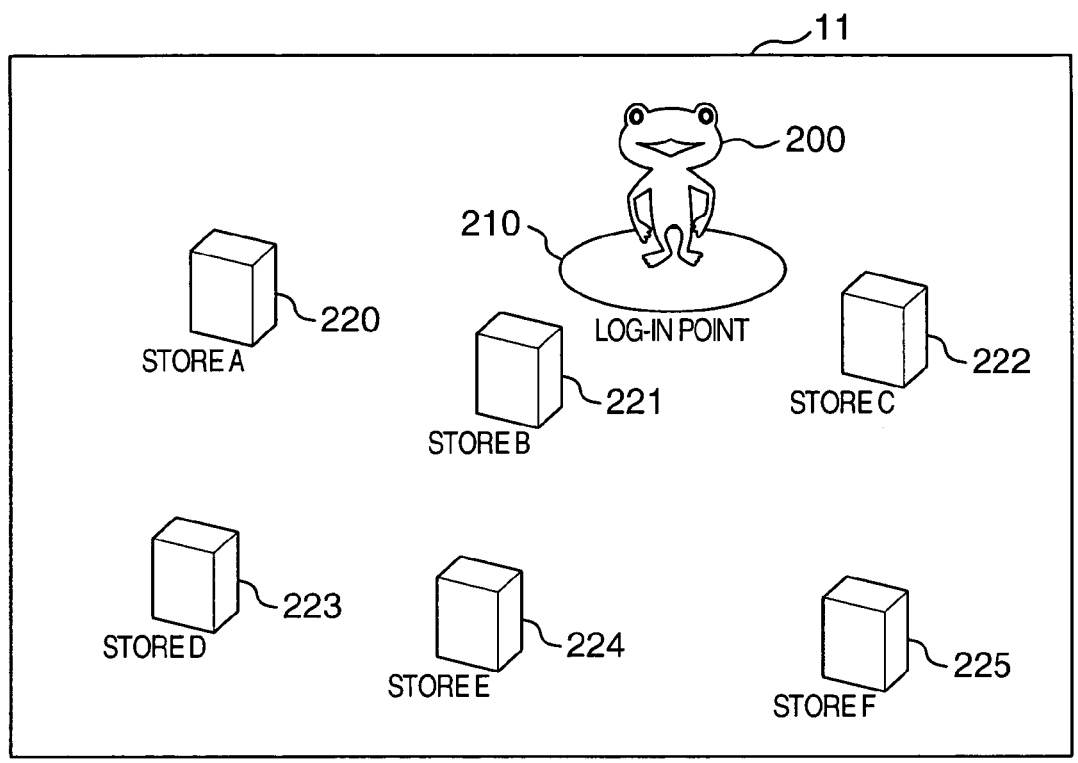
FIG. 11 is a diagram showing an example of the display on the screen according to the third embodiment.

FIG. 11 shows the state in which the service begins to be used (log-in). A cursor 200 of the user (character of frog), a log-in point 210 representing the initial position of the cursor and other points 220 to 225 (stores) are displayed on this screen. When the user logs in, the cursor 200 is first displayed on the log-in point 210. Setting the log-in point 210 at one place permits the user who has logged in to easily recognize the place where his/her cursor is displayed. This also has the advantage that other users who are already using the service on the same screen are not confused by other cursors which otherwise might abruptly appear at the same position as his/her cursor.

Figure 12:
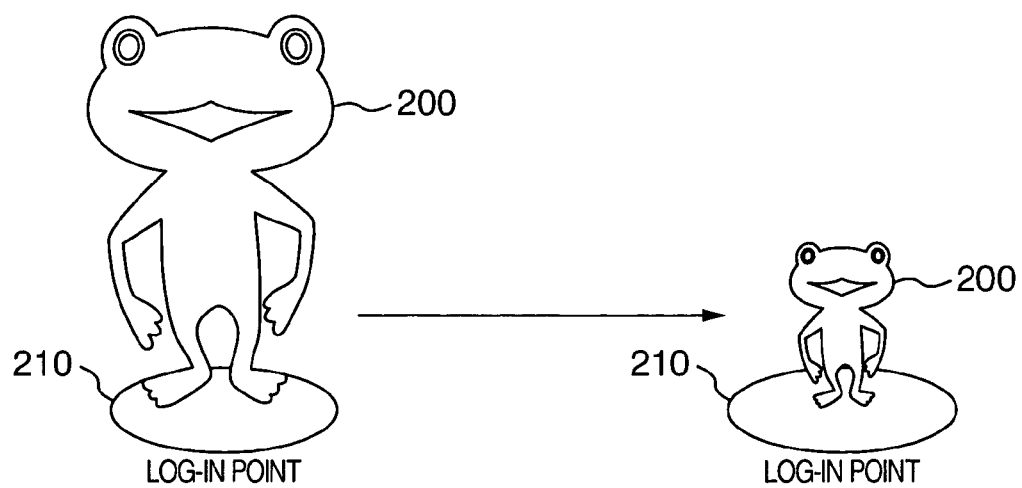
FIG. 12 is a diagram showing an example of the display on the screen according to the third embodiment.

As shown in FIG. 12, to attract the attention of the user when displaying the cursor 200 at the log-in point 210, the character of the cursor 200 may be displayed as a dynamic image which is first displayed in enlarged form and gradually reduced to the standard size.

Figure 13:
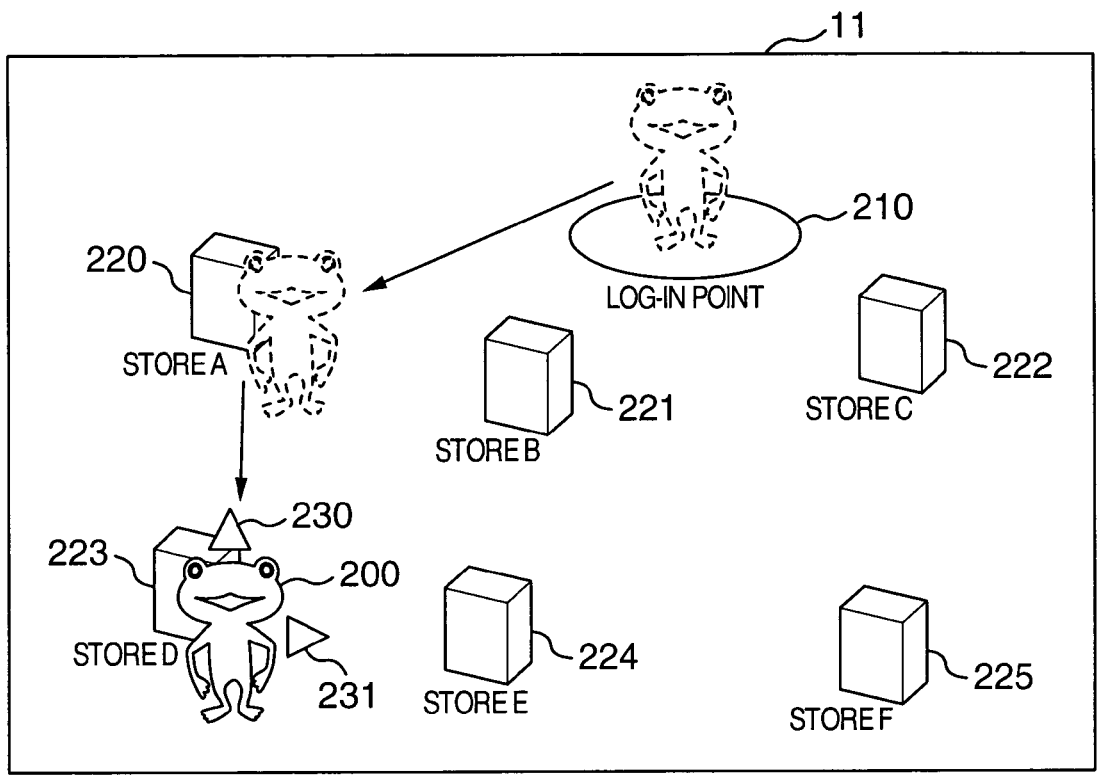
FIG. 13 is a diagram showing another example of the display on the screen according to the third embodiment.

FIG. 13 shows the manner in which the cursor moves on the screen. Specifically, the cursor 200 initially located at the log-in point 210 moves to the point 220 upon depression of the "MOVE LEFT" key by the user and then moves to the point 223 upon depression of the "MOVE DOWN" key by the user. In this way, with the user's manipulation of the move key of his/her portable telephone 40, the cursor moves from one point to another within the screen in response to the manipulation. As compared with the method according to the first embodiment in which the cursor freely moves within the screen, an arbitrary point can be selected with a fewer sessions of manipulation. This is suitable especially for a case in which the communication speed is low between the portable telephones 40 and the display server 20.

Arrows 230 and 231 indicating the directions in which the cursor is movable are displayed around the cursor 200 at the point 223. These arrows indicate that the cursor 200 can move upward and rightward, respectively.

The display server 20 makes calculations each time as required to determine whether the cursor is movable in each direction and to which point the cursor is moved by depression of a given key. As an alternative, the direction in which the cursor is movable for each point and the destination of the cursor corresponding to each move key are calculated and registered in a table beforehand, or such a table is described beforehand by the designer who has prepared the data for the main screen (whole map).

Figure 14:
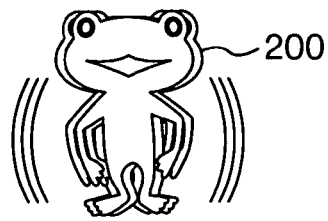
FIG. 14 is a diagram showing an example of the display on the screen according to the third embodiment.

In the case where the move key is depressed in a direction in which the cursor is immovable, the cursor is not moved. In such a case, as shown in FIG. 14, the character of the cursor 200 is vibrated at the same position (for a short period of time). As a result, the input operation of the user is transmitted to the display server 20 while at the same time notifying the user that the cursor 200 cannot move.

Figure 15:
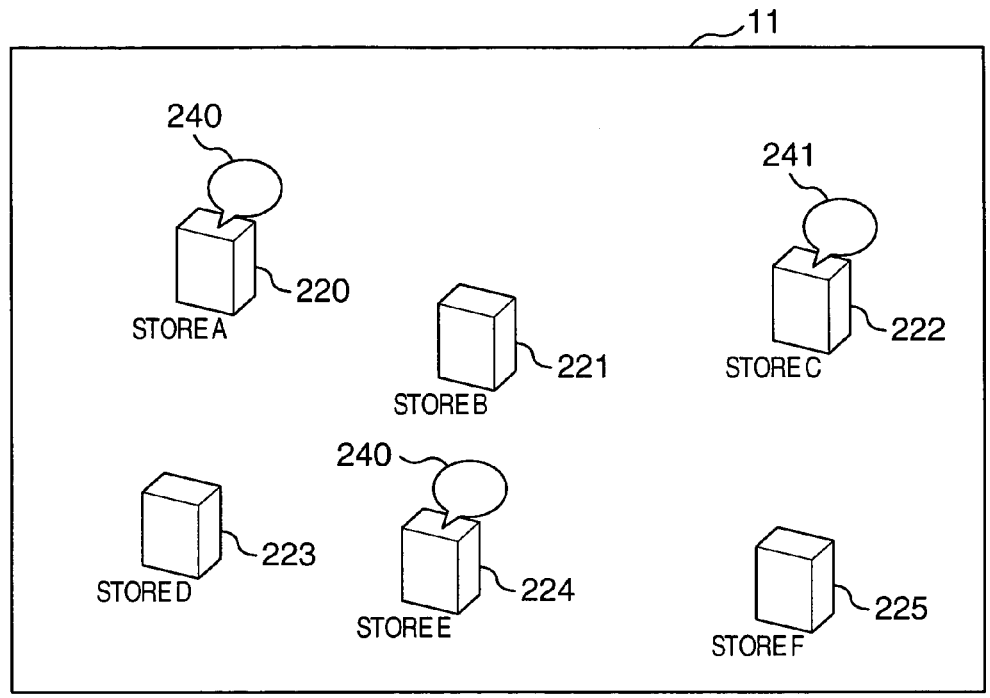
FIG. 15 is a diagram showing still another example of the display on the screen according to the third embodiment.

FIG. 15 shows the situation in which the points 220, 222 and 224 have a message. Marks 240, 241 and 242 on these points indicate that a message is contained in each of these points. A mark may indicate the summary of the message or an icon such as a "NEW" indicating the time elapsed from the update of the information.

Figure 16:
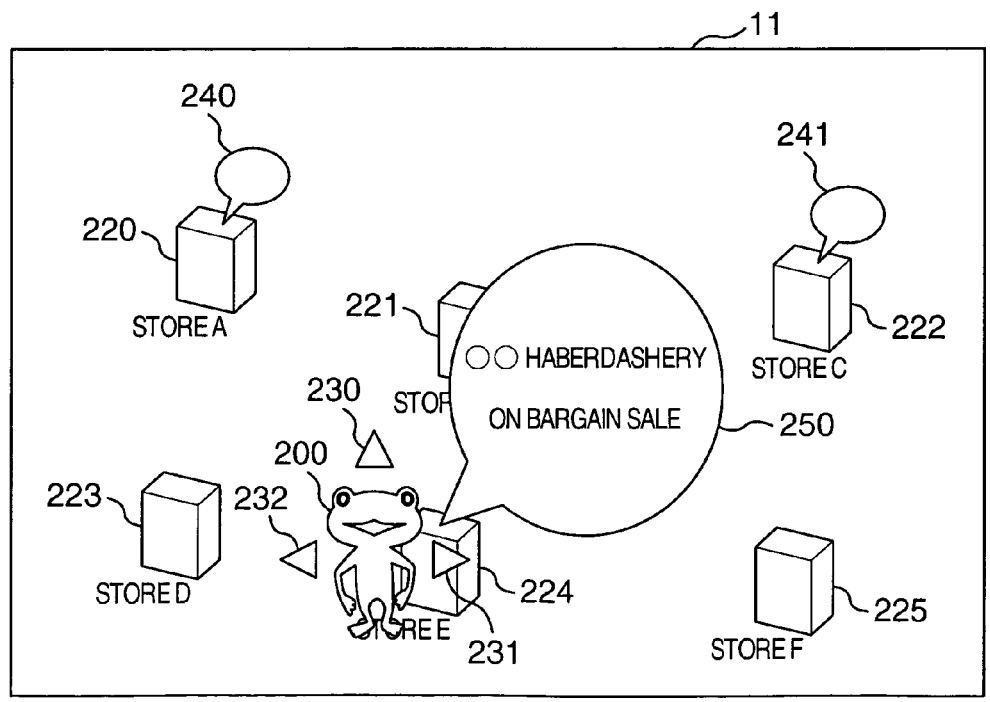
FIG. 16 is a diagram showing yet another example of the display on the screen according to the third embodiment.

FIG. 16 shows the situation in which the point 224 having a message is selected by the cursor 200 in FIG. 15. In this case, a balloon 250 indicating the contents of a message is displayed in place of the mark 242 indicating the presence of a message. The user is not required to turn his/her eyes as the message is displayed in the neighborhood of the cursor in the form of balloon. This is not an eyesore to the other users of the same screen.

Figure 17:
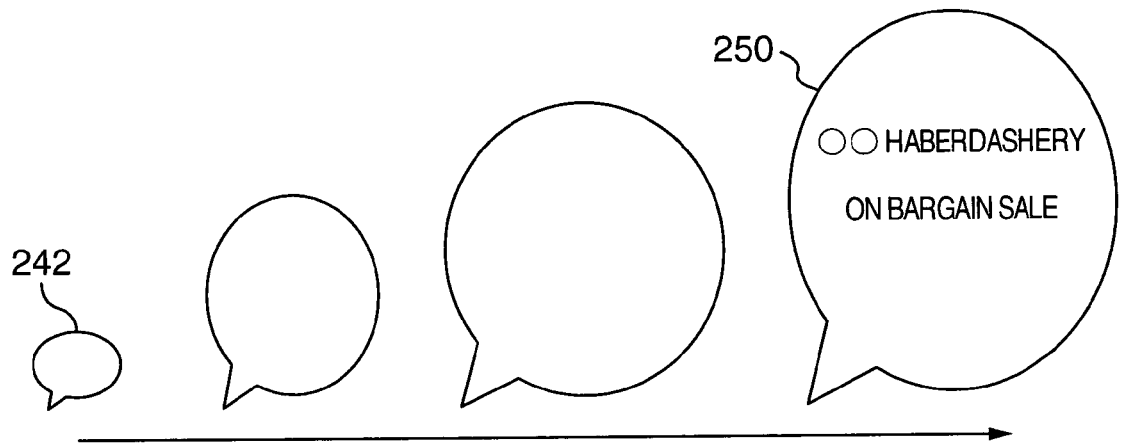
FIG. 17 is a diagram showing an example of the display on the screen according to the third embodiment.

As shown in FIG. 17, the point having a message selected by the cursor may also be displayed in such a manner that the mark 242 gradually expands into the balloon 250. This produces the effect of emphasizing to the user the relation between the three objects of display including the point, the mark and the balloon.

Figure 18:
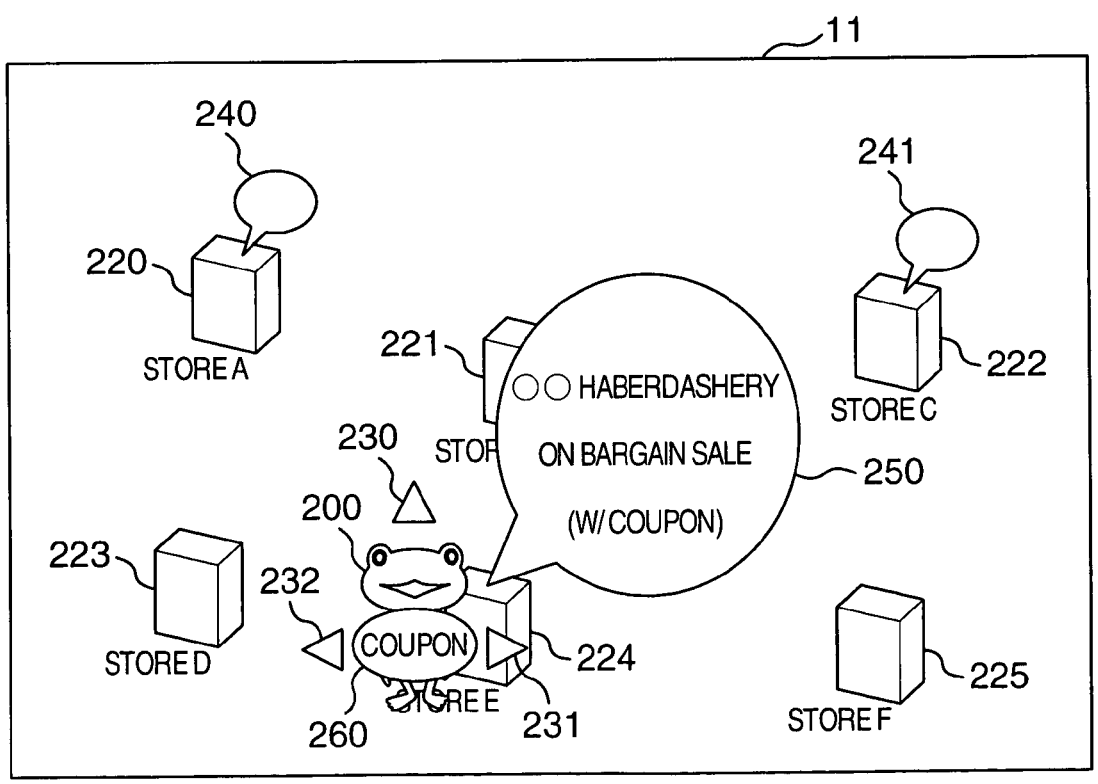
FIG. 18 is a diagram showing a further example of the display on the screen according to the third embodiment.

FIG. 18 shows a case in which the point 224 selected by the cursor 200 has contents that can be downloaded to the portable telephones 40 held by the users. An item 260 (coupon) indicating the contents is displayed. In the case where the portable telephones 40 are of such a type that the select key is located at the center of the move key, the item 260 can be displayed at the center of the arrows 230, 231 and 232 indicating the directions in which the cursor is movable. In this way, the user is notified of the key operation for downloading in an easy-to-understand way.

Figure 19:
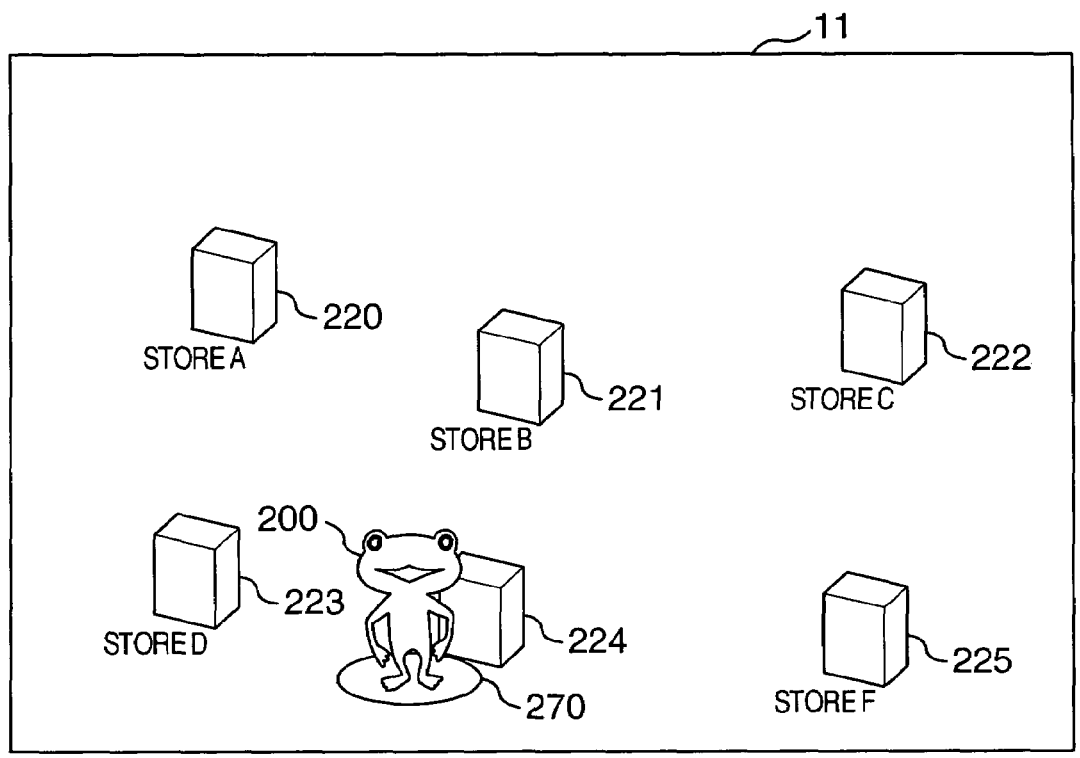
FIG. 19 is a diagram showing a still further example of the display on the screen according to the third embodiment.

FIG. 19 shows a case that the use of the service has ended (log-out). Unlike in the case of log-in, the cursor 200 disappears at the position of the point 224 selected by the cursor 200. This produces the effect of quickly execute the log-out processing.

Figure 20:
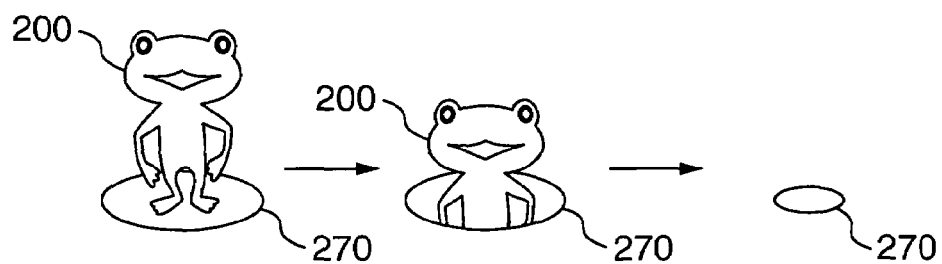
FIG. 20 is a diagram showing an example of the display on the screen according to the third embodiment.

As shown in FIG. 20, a dynamic image can be used for the log-out process in which a hole 270 is formed under the character of the cursor 200 and opened and closed as the character drops in it. The character thus moves out of the virtual space thereby to facilitate the notification of the log-out to the user.

It will thus be understood from the foregoing description that according to this invention that the display device is connected with a plurality of portable terminals to manage the exchange of data, and a user interface is provided which allows a single screen to be shared by a plurality of users. In this way, a plurality of users can use a single display device at the same time.

Also, the methods of connecting each portable terminal and the display device and the method of presenting the data to be displayed can be appropriately selected and combined to construct a system which serves the purposes of the system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information display system comprising:
    a display device, including a display screen, for controlling the contents of display in accordance with a request from at least one of portable terminals held by users;
    a display server for controlling said display device such that said display screen on which the contents of display are displayed can be shared by a plurality of users and the contents displayed on said display screen can be controlled separately from each other in accordance with requests from the users; and
    a portable terminal server for forwarding a program for using said information display system to said portable terminals and acting as an intermediary for data exchange between said portable terminals and said display server,
    wherein said display server divides a display area of said display screen into a plurality of display areas, assigns the users the divided display areas each performing a display including a menu, displays each divided display area with an icon unique to the divided display area on the display screen, and renders, via said portable terminal server, the icon applied to the divided display area on said display screen to be displayed on a display screen of the portable terminal of the user using the display area with the icon; and wherein said display screen of the portable terminal is different from said display screen of the display device.

2. An information display system according to claim 1, wherein data of said display contents are stored in a memory of said display server.

3. An information display system according to claim 1, wherein said program includes a function of transmitting a key input for said portable terminal to said portable terminal server, and a function of displaying data transmitted from said portable terminal server on the screen of said portable terminal.

4. An information display system according to claim 2, wherein said program includes a function of transmitting a key input for said portable terminal to said portable terminal server, and a function of displaying data transmitted from said portable terminal server on the screen of said portable terminal.

5. In an information display system comprising a display screen, a display server for controlling the display screen and a portable terminal server configured to forward a program to portable terminals for using the display screen and to coordinate data exchange between the portable terminals and the display server, a method for users of the portable terminals to share the display screen comprising:

dividing the display screen into a plurality of display areas, wherein each display area is assigned to a respective user of a portable terminal to view contents, and each display area is separately controllable in accordance with request from each assigned user;

in each display area, displaying a menu;

for each respective display area, displaying an icon unique to the respective display area;

and for each respective display area, rendering, via the portable terminal server, the icon unique to the respective display area to be displayed on a display screen of a portable terminal of a corresponding user assigned to use the respective display area;

wherein the display screen of the respective portable terminal is different from the display screen of the information display system.

6. A display server for working with a display device and a portable terminal server to allow the display device to be shared among multiple portable terminals, wherein the display server is configured to:

divide the display device into a plurality of display areas, wherein each display area is assigned to a respective user of a portable terminal to view contents, and each display area is separately controllable in accordance with request from each assigned user;

in each display area, display a menu;

for each respective display area, display an icon unique to the respective display area; and for each respective display area, render, via the portable terminal server, the icon unique to the respective display area to be displayed on a display screen of a portable terminal of a corresponding user assigned to use the respective display area, wherein the portable terminal server is configured to forward a program to the portable terminals for using the display screen and to coordinate data exchange between the portable terminals and the display server, and the display screen of the respective portable terminal is different from the display device.

* * * * *